United States Patent
Thompson

(10) Patent No.: US 11,014,654 B2
(45) Date of Patent: May 25, 2021

(54) PITCH TRIMMER

(71) Applicant: Airbus Operations Limited, Bristol (GB)

(72) Inventor: Robert Ian Thompson, Bristol (GB)

(73) Assignee: Airbus Operations Limited, Bristol (GB)

( * ) Notice: Subject to any disclaimer, the term of this patent is extended or adjusted under 35 U.S.C. 154(b) by 262 days.

(21) Appl. No.: 16/018,809

(22) Filed: Jun. 26, 2018

(65) Prior Publication Data

US 2019/0002089 A1    Jan. 3, 2019

(30) Foreign Application Priority Data

Jun. 30, 2017  (GB) ..................... 1710570

(51) Int. Cl.
| | |
|---|---|
| *B64C 25/40* | (2006.01) |
| *B64C 25/36* | (2006.01) |
| *B64C 25/10* | (2006.01) |
| *B64C 25/60* | (2006.01) |

(52) U.S. Cl.
CPC ............. *B64C 25/40* (2013.01); *B64C 25/10* (2013.01); *B64C 25/36* (2013.01); *B64C 25/60* (2013.01)

(58) Field of Classification Search
CPC ... B64C 2025/006; B64C 25/40; B64C 25/36; B64C 25/60
See application file for complete search history.

(56) References Cited

U.S. PATENT DOCUMENTS

| | | | | |
|---|---|---|---|---|
| 2,731,218 | A * | 1/1956 | Bonar | B64C 25/14 244/104 FP |
| 2,732,152 | A * | 1/1956 | Nielson | B64C 25/60 244/104 FP |
| 7,731,124 | B2* | 6/2010 | Griffin | B64C 25/34 244/102 R |

(Continued)

FOREIGN PATENT DOCUMENTS

| | | |
|---|---|---|
| GB | 635885 | 4/1950 |
| GB | 707791 | 4/1954 |

(Continued)

OTHER PUBLICATIONS

Combined Search and Examination Report for GB 1710570.1 dated Jan. 2, 2018, 7 pages.

*Primary Examiner* — Richard R. Green
*Assistant Examiner* — Arfan Y. Sinaki
(74) *Attorney, Agent, or Firm* — Nixon & Vanderhye P.C.

(57) ABSTRACT

A landing gear assembly (12) includes a primary load bearing strut including a shock absorber having a slider part (15) arranged to slide within a cylinder part (17). A link assembly (50) is attached between the slider part (15) and the cylinder part (17). A bogie (16) supporting wheels is mounted on the strut. The bogie may adopt different pitch angles. A pitch trimmer device (70) is attached to the bogie and to the link assembly, for example thus providing a relatively long moment arm (96) for control of the bogie pitch angle. The arrangement may be such that the pitch trimmer (70) is near mid-stroke as the aircraft achieves the full weight on wheels condition, whereas the pitch trimmer is at a fullest extent for flight case and for retraction. Onset of pitch trimmer closure/movement is used to detect the weight-on-wheels condition.

17 Claims, 10 Drawing Sheets

(56) References Cited

U.S. PATENT DOCUMENTS

| | | | | |
|---|---|---|---|---|
| 8,448,900 B2* | 5/2013 | Mellor | ................... | B64C 25/20 |
| | | | | 244/102 A |
| 8,998,129 B2* | 4/2015 | Bennett | ................... | B64C 25/34 |
| | | | | 244/50 |
| 9,321,524 B2* | 4/2016 | Holloway | ............... | B64C 25/14 |
| 2003/0033927 A1* | 2/2003 | Bryant | ................... | B64C 25/62 |
| | | | | 91/471 |
| 2009/0050736 A1* | 2/2009 | Bennett | ................... | B64C 25/58 |
| | | | | 244/102 R |
| 2012/0126055 A1* | 5/2012 | Lindahl | ................... | B64C 25/60 |
| | | | | 244/104 FP |
| 2012/0211600 A1* | 8/2012 | Mellor | ................... | B64C 25/00 |
| | | | | 244/100 R |
| 2014/0346273 A1* | 11/2014 | Nelson | ................... | B64C 25/34 |
| | | | | 244/102 A |
| 2015/0375856 A1* | 12/2015 | Hodgkinson | ........... | B64C 25/34 |
| | | | | 244/104 R |

FOREIGN PATENT DOCUMENTS

| | | | | | |
|---|---|---|---|---|---|
| GB | 707791 | A | * | 4/1954 | ........... B64C 25/505 |
| GB | 893013 | | | 4/1962 | |
| GB | 893013 | A | * | 4/1962 | ............. B64C 25/34 |

* cited by examiner

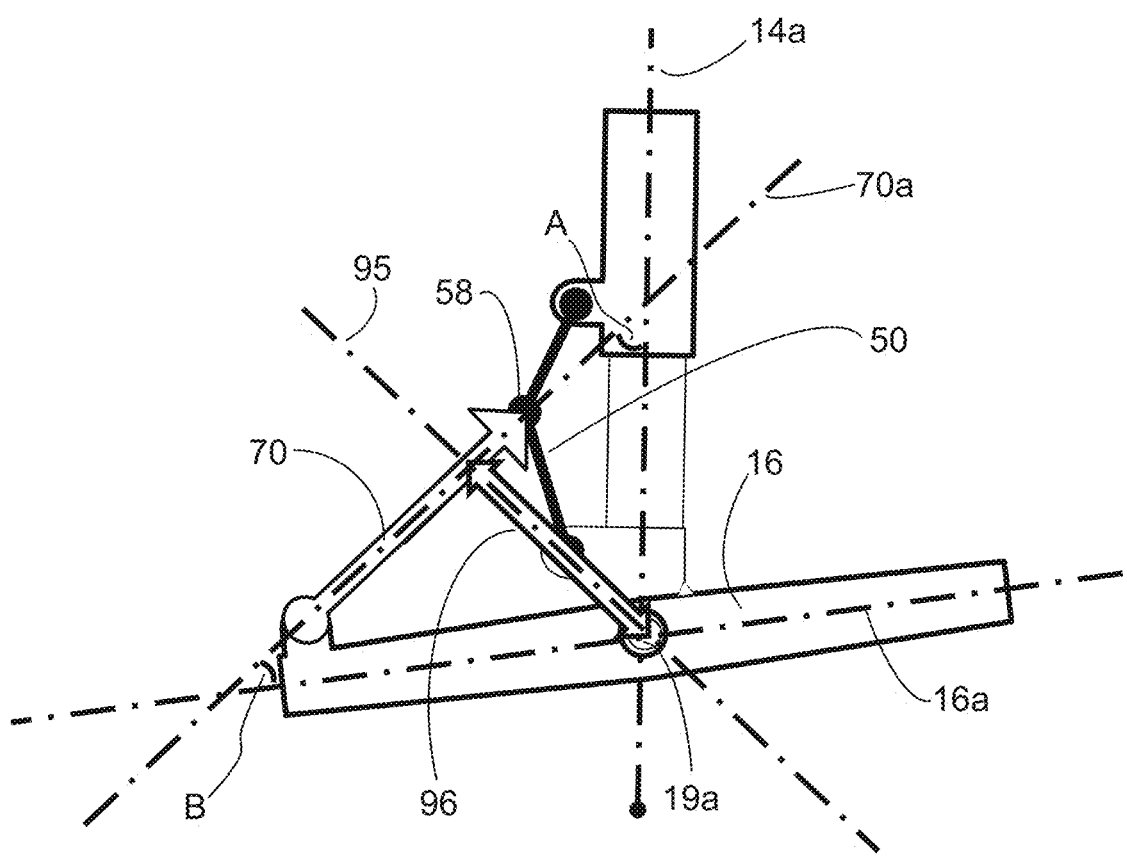

PITCH TRIMMER

RELATED APPLICATION

This application claims priority to United Kingdom Patent Application GB 1710570.1, filed 30 Jun. 2017, which is entirely incorporated by reference.

BACKGROUND OF THE INVENTION

The present invention concerns an aircraft landing gear. More particularly, but not exclusively, this invention concerns a landing gear assembly including both a bogie having a pitch angle that may be varied, for example to allow for efficient retraction of the landing gear assembly, and a pitch trimmer device for setting the pitch angle of the bogie. The invention also concerns a wing assembly including such a landing gear assembly, an aircraft including such a landing gear assembly, a pitch trimmer device, and also various methods of use of one or more of those items.

In the prior art there are many examples of aircraft, of the type which includes a landing gear assembly including a leg at the lower end of which is mounted a bogie in such a way that the bogie may adopt different pitch angles. FIG. 2 shows a typical configuration, of the prior art, of a landing gear assembly and a passive pitch trimmer device for accommodating a change in pitch angle of the bogie. The landing gear 112 of FIG. 2 has a landing gear leg 114 at the lower end of which there is mounted a bogie 116 including a bogie beam which carries two sets of wheels 118. The landing gear leg 114 has a slider part 115 arranged to slide within a cylinder part 117, the slider and cylinder forming an oleo-type shock absorber. A change in pitch angle of the bogie 116 is accommodated by means of a pitch trimmer device 120 which is mounted at one end 122 to an end of the bogie 116 and at the other end 124 to a location at the lower end of the leg 114. The pitch trimmer device 120 is configured so as to cause the bogie beam to adopt a set pitch angle for retraction of the landing gear into the landing gear bay. The pitch trimmer allows the bogie to move from this set angle when acted upon by external forces, such as when contacting the ground, and provides pitch damping. The forward direction in FIG. 2 is shown by arrow F. The pitch trimmer of FIG. 2 is not connected to the aircraft hydraulic supply and this includes its own independent accumulator 126. The pitch trimmer is relatively heavy, both as a result of the need for it to have its own accumulator 126 and because of the amount of force it needs to generate in order to cause movement of the bogie, as a result of the geometry. The pitch trimmer of FIG. 2 operates independently of the extension and/or compression of the shock absorber.

US 2003/0033927 discloses an aircraft landing gear, in which the pitch trimming device for the bogie may be locked to assume a fixed length and is illustrated by FIG. 3. Like reference numerals denote like elements, and only those elements of the landing gear of FIG. 3 which differ significantly with respect to those of FIG. 2 will now be discussed. The landing gear leg 114 includes a hydraulic strut 130 attached at one end to a part 132 of the cylinder 117 and at the other end to a part 134 of the bogie. The hydraulic strut 130 may be locked in position under the control of a control system (not shown).

U.S. Pat. No. 7,731,124 discloses an aircraft landing gear, in which the pitch angle of the bogie may be varied by means of a rotary actuation system, which is illustrated by FIG. 4. Like reference numerals denote like elements, and only those elements of the landing gear of FIG. 4 which differ significantly with respect to those of FIG. 2 will now be discussed. The rotary actuation system includes a rotating arm 140 which is mounted at one end on a part 142 fixed to the cylinder 117 of the landing gear leg 114 and at the other end to an end of a passive hydraulic link 144. The other end of the passive hydraulic link attaches to an end of the bogie 116. The rotating arm 140 is driven by a rotary drive mechanism included within part 142.

U.S. Pat. No. 9,321,524 discloses an aircraft landing gear including a bogie articulation mechanism and a pitch trimmer device, which is illustrated by FIG. 5. Like reference numerals denote like elements, and only those elements of the landing gear of FIG. 5 which differ significantly with respect to those of FIG. 2 will now be discussed. The landing gear assembly includes a torque link assembly 150 having a first torque link 152 coupled (by a mechanism 164 shown only schematically in FIG. 5) to the bogie 116 and a second torque link 154 attached to the cylinder part 117 of the landing gear leg 114. A hydraulic pitch trim actuator 160 extends from (a) a first end connected to a linkage assembly 162 (not shown separately in FIG. 5) in the region of the cylinder 117 to (b) a second end connected to a part 156 at the apex of the torque link assembly 150. The pitch trimmer device of US '524 is connected to the landing gear assembly via complicated extra structure.

A Boeing 747 wing gear of the prior art has a comparable arrangement to that shown in FIG. 5 in that the landing gear assembly includes a torque link assembly and a pitch trimmer device which extends from (a) a first end connected to the cylinder (above the slider) of the landing gear leg to (b) a second end connected to a bell crank at the apex of the torque link assembly, which in turn is connect to the bogie by a further link. The use of the bell crank at the torque link apex provides for a greater range of pitch angles.

It will be appreciated that each of FIGS. to 2 to 5 are schematic illustrations and omit various elements for the sake of clarity.

The present invention seeks to mitigate one or more of the above-mentioned problems. Alternatively or additionally, the present invention seeks to provide an improved landing gear and/or an improved pitch trimmer arrangement.

SUMMARY OF THE INVENTION

The present invention provides, according to a first aspect, an aircraft landing gear assembly including a strut, for example the primary load bearing strut of the landing gear assembly, comprising a shock absorber. The shock absorber has a slider part arranged to slide within a cylinder part. The landing gear assembly includes a link assembly, for example attaching at a first end to the slider part and at a second end to the cylinder part. The landing gear assembly includes a bogie on which multiple wheels may be supported by multiple axles. The bogie is mounted on the strut such that the bogie may adopt different pitch angles. There is also provided a pitch trimmer device. The pitch trimmer device may be arranged to set the pitch angle of the bogie. The pitch trimmer device is attached at a first end to the bogie and at a second end to the link assembly. In embodiments of the invention, such an arrangement has been found to be beneficial in various respects. A longer moment arm can be generated, with a simple lightweight structure. Particularly when the pitch trimmer device is provided in the form of a linear hydraulic actuator, the resulting geometry can provide for a relatively long stroke length and/or provide other operational advantages.

The link assembly may be arranged to resist rotation of the slider part relative to the cylinder part, about the longitudinal axis of the shock absorber. The link assembly to which the pitch trimmer device is attached may be in the form of a torque link assembly, for example the primary torque links of the landing gear assembly. It may be that the link assembly to which the pitch trimmer device is attached is different from, and separate to, the link assembly which acts as the primary torque link assembly of the landing gear assembly. It may be that there is a false torque link set and a primary torque link set on the landing gear. In such a case, the pitch trimmer may be associated with the false torque link assembly.

The link assembly with which the pitch trimmer device is associated may be provided in front of the landing gear strut, but it is preferred that the pitch trimmer and its associated link assembly are positioned behind the landing gear strut, so as to be at least partially shielded by the landing gear strut during flight, for example against bird strike.

The link assembly may include a first link member which extends from the first end of the link assembly and a second link member which extends from the second end of the link assembly. The first and second link members may be rotatably attached to each other at a hinge location. The end of the pitch trimmer device that is associated with the link assembly may be attached at a location that, along the length of the link assembly when at its most open, is closer to the hinge location than to either end of the link assembly. It may be that that end of the pitch trimmer device is attached to the link assembly at, or directly adjacent to, the hinge location of the link assembly.

The pitch trimmer device may be arranged to move the bogie so as to vary the pitch angle of the bogie and/or set the pitch angle. The pitch trimmer device may be a passive device arranged to set the pitch angle, for example, as a result of the action of a stop mechanism (such as for example defining the end of travel of the pitch trimmer device). The pitch trimmer device may be a powered device for causing such movement. The pitch trimmer device may be in the form of a linear actuator. The pitch trimmer device may be in the form of a hydraulic actuator. The pitch trimmer device may be provided with its own dedicated power source. It is preferred however, particularly when the pitch trimmer device is in the form of a hydraulic actuator, that the power source for powering the pitch trimmer device is one that is arranged to provide power to other components of the aircraft. For example, the power source may be shared with a hydraulic circuit that serves one or more other components of the aircraft. Such other components may be located on parts of the aircraft other than the landing gear for example. The pitch trimmer device may be arranged to actuate in a single direction only. For example, the pitch trimmer device may be in the form of a single acting (mono-directional) device. It is preferred that the pitch trimmer device is able to deliver force by means of extending, possibly being able to deliver force only by means of extending (i.e. unable to deliver a force by means of contracting). It may be that the pitch trimmer device is arranged to be able to compress or extend on application of an external force, at least up until the point at which the pitch trimmer device reaches an extreme position (e.g. a stop).

It may be that the geometry of the landing gear assembly is such that the pitch trimmer device is able, in use, to adopt a position in which the line of action of the pitch trimmer device is at an angle of more than 30 degrees, for example more than 40 degrees, to the longitudinal axis of the bogie. The longitudinal axis of the bogie will typically be assumed to be parallel to the plane on which the axes of rotation of the wheels lie, and perpendicular to those axes of rotation. (When the bogie comprises a bogie beam, the longitudinal axis of the bogie will typically lie in a direction along the length of the bogie beam.) It may be that the geometry of the landing gear assembly is such that the pitch trimmer device is able, in use, to adopt a position in which the line of action of the pitch trimmer device is at an angle of more than 30 degrees, for example more than 40 degrees, to the longitudinal axis of the landing gear strut.

The lowermost attachment of the link assembly is typically formed by means of a lower link being attached directly to the landing gear leg, typically to the slider part (that typically extending below the cylinder part). The uppermost attachment of the link assembly is typically formed by means of an upper link being attached directly to the landing gear leg, typically to the cylinder part (that typically extending above the slider part). The pitch trimmer device is typically directly attached at its first end to a part of the bogie. The pitch trimmer device is typically directly attached at its second to the link assembly. The first end of the pitch trimmer device may be attached to the bogie at a location towards the end of the bogie (e.g. nearer, along the length of the bogie beam, to the axle at the end of the beam than to intersection between the bogie beam and the longitudinal axis of the primary load bearing strut).

The present invention may have particular application in relation to a retractable landing gear assembly. Thus, in use, the landing gear may be configured to move between a first, deployed, configuration (for use during landing and take-off) and a second, retracted, configuration (for use during flight). The primary load bearing strut of the landing gear will be arranged so as to be generally upright (typically at a small angle to the vertical) when the aircraft is stationary on the ground. It may be that the landing gear assembly has an optimal configuration for retraction. Such an optimal configuration may include the bogie being pitched at a particular angle. The geometry of the landing gear assembly may be such that if the bogie has not moved so that it is pitched at that particular angle immediately before the landing gear is retracted, it will always be the case that the pitch trimmer device will be required to extend (rather than contract) in order to move the bogie so that it is pitched at that particular angle. For example, the geometry of the landing gear assembly may be such that in the flight condition the bogie is pitched at that particular angle when the pitch trimmer device is at its fullest extent. It may, additionally, or alternatively be the case that the geometry of the landing gear assembly is such that in the full weight-on-wheels configuration in equilibrium the pitch trimmer device is in or near its midway position.

It may, additionally, or alternatively be the case that the geometry of the landing gear assembly is such that when the landing gear is deployed during the approach on landing so that the landing gear shock absorber is extended and the pitch trimmer device is fully extended, the bogie is inclined so that the wheels at the rear of the bogie are configured to touchdown before the wheels at the front. It may additionally be the case that when the landing gear assembly has such a configuration that any compression of the pitch trimmer device would only rotate the bogie to further lower the rear wheels and raise the front wheels.

The pitch trimmer device may be relatively slender and lightweight. The pitch trimmer device may for example have a length when fully extended that is at least five times the widest diameter of its cylinder, preferably at least eight times the widest diameter, and possibly at least ten times the widest diameter. The diameter of the pitch trimmer, at its widest, may be less than 20 cm, possibly less than 15 cm. The distance between the points of attachment of the pitch trimmer device (which may for example be used to define its length) when at its greatest length may be greater than 1 m. The pitch trimmer device may have a stroke length of at least 20 cm, preferably longer than 30 cm, and possibly longer than 40 cm, or 50 cm or longer. The different in pitch trimmer length between the position it assumes immediately before landing gear retraction (in the case where the landing gear is retractable) and the position it assumes when the aircraft is stationary on the ground (with the aircraft at its maximum take-off weight) may be at least 20 cm, preferably longer than 30 cm, and possibly longer than 40 cm, or 50 cm or longer. The pitch trimmer device may have a mass of less than 50 Kg, for example less than 40 Kg. The pitch trimmer device may be so configured that it can provide a moment arm longer than 50 cm, preferably longer than 75 cm, and possibly one metre or longer.

There may be a flexible joint providing at least two degrees of freedom of movement between an end of the pitch trimmer device and the bogie. There may be a flexible joint providing at least two degrees of freedom of movement between an end of the pitch trimmer device and the link assembly. Such a flexible joint may be in the form of a spherical joint, for example a ball and socket type joint.

The landing gear assembly and/or the pitch trimmer device may include a measuring system, comprising one or more sensors for example, which produces a signal from which at least one of movement and position of the bogie may be detected. There may be a measuring system configured to detect a weight on wheels condition. It may achieve this by means of detecting movement. For example, the pitch trimmer device, shock absorber of the strut, and the bogie may all adopt a neutral/equilibrium state immediately before touchdown such that immediately after touchdown when the shock absorber will compress and/or the bogie pitch will change, the length of the pitch trimmer device will be caused to change. This change in length/movement can be detected and be interpreted as a result of touchdown of one or more wheels of the bogie. The geometry may be such that the stroke length of the pitch trimmer device is at its maximum immediately before landing, such that any change in length will always be as a result of a contraction of the pitch trimmer device. The geometry may be such that the bogie is designed to pitch at an angle immediately before touchdown so that one or more wheels are expected to touchdown in advance of others on the same bogie. In such a case, the geometry may be such that the first wheel on the bogie to touchdown causes movement of the bogie that urges the pitch trimmer to move (e.g. contract or extend) in one direction and such that contraction of the shock absorber (when there is weight-on-wheels) also causes the pitch trimmer to move in that same one direction. A change in length/movement of the pitch trimmer can be detected and be interpreted as a result of touchdown of one or more wheels of the bogie and/or the weight-on-wheels condition.

The above measuring system and/or any of the one or more sensors of the measuring system may comprise a measuring device, or part thereof, for measuring relative movement between the bogie and the link assembly. Such a suitable measuring device is described and claimed in all of (a) UK patent application entitled "Aircraft Landing Gear Assembly" with agent's reference "P026752 GB" and marked with the reference "12010-GB-NP" in the header of the patent specification as filed, (b) UK patent application entitled "Aircraft Landing Gear Assembly" with agent's reference "P026754 GB" and marked with the reference "12211-GB-NP" in the header of the patent specification as filed, and (c) UK patent application entitled "Aircraft Landing Gear Assembly" with agent's reference "P026755 GB" and marked with the reference "12212-GB-NP" in the header of the patent specification as filed, each application having the same filing date as the present application. The contents of those applications are fully incorporated herein by reference. The claims of the present application may incorporate any of the features disclosed in that patent application. In particular, the claims of the present application may be amended to include features relating to movement detector as set forth in the claims of any of the aforementioned other patent applications.

The landing gear may be a main landing gear. The landing gear may be a nose landing gear. The landing gear may be a wing-mounted landing gear. The landing gear may be configured to be mounted to the fuselage of an aircraft.

In another aspect of the invention, there may be provided a wing assembly comprising a landing gear assembly in accordance with any other aspect.

In another aspect of the invention, there is provided an aircraft comprising a landing gear according to any other aspect. An aircraft may comprise more than one landing gear in accordance with the present invention. There may be such landing gears one or more being located on opposite sides of the aircraft.

The aircraft may be a commercial aircraft, for example an aircraft configured to transport more than 50 passengers, for example more than 100 passengers, for example more than 200 passengers or an equivalent cargo load. The aircraft may be a commercial passenger aircraft. The aircraft may be a fixed wing aircraft.

The aircraft may include an electronic control system, for example a computer control system, which assists the pilot during landing of the aircraft. Such a control system may be arranged to detect when the aircraft has touched down on the ground. There may be detection of a weight-on-wheels condition for one or more wheels and/or one or more landing gear assemblies of the aircraft. It may be that the pitch trimmer is so arranged that it is moved by means of touch-down of a wheel on the bogie. The pitch trimmer may include, or otherwise be associated with, a sensor which detects touch-down. For example, the sensor may detect movement of the pitch trimmer from its position immediately before touchdown of the wheel of the bogie. Such a sensor need not necessarily be able to determine the relative position of the pitch trimmer and may only have the ability to detect movement, not position. Additionally, or alternatively, the sensor may detect the position of the pitch trimmer, for example the position of the pitch trimmer as a measure of where it is between its extreme positions (e.g. fully compressed/closed and fully extended/open). The geometry of the landing gear may be such that the position of the pitch trimmer after touch-down of one or more (or all) of the wheel(s) of the bogie will always be different from its position immediately before landing such that a measure of one or both of (a) the position of the pitch trimmer and (b) movement of the pitch trimmer can be used to determine the weight on wheels condition. The sensor may generate an electronic signal from which the weight on wheels condition can be determined. The electronic control system of the aircraft may receive an electronic signal from the sensor, and possibly also from other similar sensors on other landing gear assemblies of the aircraft, and use such signal(s) in determining when the aircraft (or one or more landing gear assemblies of the aircraft on an individual basis) has touched down. Other data/signals may be used in the determination of the touchdown condition.

In the case where the pitch trimmer device is a powered device and the power source for powering the pitch trimmer device is provided on the aircraft for powering other components, there may be one or more power-supply conduits (for example comprising electric cables/wires, hydraulic fluid pipes or the like) for the supply of power to the pitch trimmer device. One or more such power-supply conduits may be routed from the pitch trimmer to the aircraft via the landing gear.

There is also provided according to a yet further aspect of the invention, a method of operating a pitch trimmer or similar device, for example being a pitch trimmer device according to any other aspect of the invention as claimed or described herein. Thus, for example, there is provided a method of retracting a landing gear assembly from a deployed position to a stowed position. Such a landing gear assembly may include a landing gear leg, at the bottom of which there is a bogie having wheels mounted on multiple axles. The leg may include a shock absorber moveable between a compressed configuration and an extended configuration, and a link assembly which accommodates movement of the shock absorber as it moves between those configurations. The link assembly may be attached at a first end to an upper part of the landing gear leg and attached at a second end to a lower part of the landing gear leg. After take-off of the aircraft, there may be a step of moving the bogie so that it adopts a target pitch angle for retraction. This may be achieved by means of a powered device, for example a pitch trimmer device, that has a line of action that extends between a position on the bogie and a position on the link assembly. The method, may alternatively or additionally, include a step of varying the pitch angle of the bogie of the landing gear assembly with the use of a pitch trimmer according to any other aspect of the invention as claimed or described herein.

There is also provided a method of repositioning a landing gear bogie on a landing gear assembly of an aircraft when the landing gear assembly is deployed and the aircraft is on the ground. The method may for example include varying the pitch angle of the landing gear bogie—with the change in pitch angle being caused by, or being accommodated by, movement of a pitch trimmer according to any other aspect of the invention as claimed or described herein. Such a method may be performed to enable maintenance of the bogie and/or one or more wheels on the bogie, for example to enable one or more tyres to be changed. Such a method may also be of use in a nose gear collapse case. The geometry of the landing gear assembly may enable the pitch trimmer to have plenty of stroke length to enable such movements to be made. It will be appreciated that the position of the pitch angle of the landing gear bogie may be varied manually, or with other external forces being applied, as an alternative to—or in addition to—power being provided via the pitch trimmer.

There is also provided a method of detecting weight on wheels during landing of an aircraft having a pitch trimmer according to any other aspect of the invention as claimed or described herein. The geometry of the pitch trimmer and its installation on the aircraft may be such that the pitch trimmer is moved by means of touch-down of a wheel on the bogie. The method of detecting weight on wheels may thus include a step of a sensor (i.e. one or more sensors) detecting at least one of (a) the movement of the pitch trimmer and (b) the position of the pitch trimmer. It may be that one or more signals from the sensor(s) are received by a control system of the aircraft and are used to detect the weight on wheels condition. Wheel braking, reverse thrust and/or one or more other means of decelerating the aircraft may be employed in dependence, at least in part, on the signal received by the aircraft control system from the sensor.

There may also be provided a method of landing an aircraft which includes use of a pitch trimmer or similar device, for example being a pitch trimmer device according to any other aspect of the invention as claimed or described herein.

There is yet further provided a landing gear assembly including a landing gear leg having a lower portion to which a bogie assembly is attached, the landing gear leg assembly having a link assembly which attaches at a first end to an upper part of the landing gear leg assembly and attaches at a second end to a lower part of the landing gear leg assembly, and a powered pitch trimmer device which acts between a location on the bogie assembly and a location on the link assembly for varying the pitch angle of the bogie assembly.

There is also provided a pitch trimmer device configured so as to be suitable for use as the device of any of the other aspects of the invention as claimed or described herein. Such a pitch trimmer may for example be supplied separately from the landing gear and/or bogie with which it is intended for use. It may be that the landing gear assembly is provided separately from the pitch trimmer, but will include attachment points configured specifically for installation of a pitch trimmer device according to the present invention.

A kit of parts may be provided comprising a pitch trimmer device according to the present invention. The kit may also include a bogie, for example having an attachment point for a pitch trimmer device according to the present invention. The kit may also include a torque link set for a landing gear, the torque link set for example having an attachment point for a pitch trimmer device according to the present invention.

It will of course be appreciated that features described in relation to one aspect of the present invention may be incorporated into other aspects of the present invention. For example, the method of the invention may incorporate any of the features described with reference to the apparatus of the invention and vice versa. The term 'or' shall be interpreted as 'and/or' unless the context requires otherwise.

DESCRIPTION OF THE DRAWINGS

Embodiments of the present invention will now be described by way of example only with reference to the accompanying schematic drawings of which.

DETAILED DESCRIPTION

Figure 1:
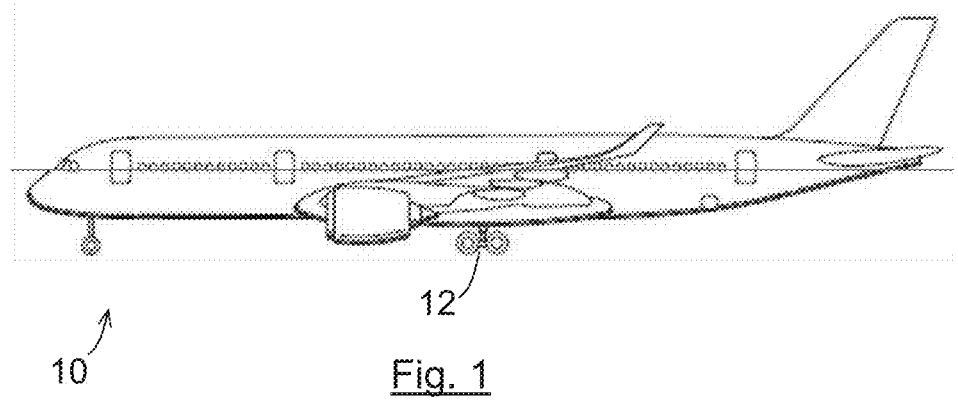
FIG. 1 is a side view of an aircraft comprising a landing gear and a bogie on which a pitch trimmer may be mounted.

FIG. 1 shows an aircraft 10 comprising a main landing gear 12, e.g., a primary load bearing strut, wherein the aircraft being of a type that may be employed as the aircraft with which the landing gear of any of the illustrated embodiments may be used. The aircraft 10 thus includes a landing gear assembly 12 including a bogie, which is mounted on the lower end of the landing gear leg in such a way that the bogie may adopt different pitch angles.

FIGS. 2 to 5 are drawings showing schematically types of pitch trimmer arrangements of the prior art.

Figure 6:
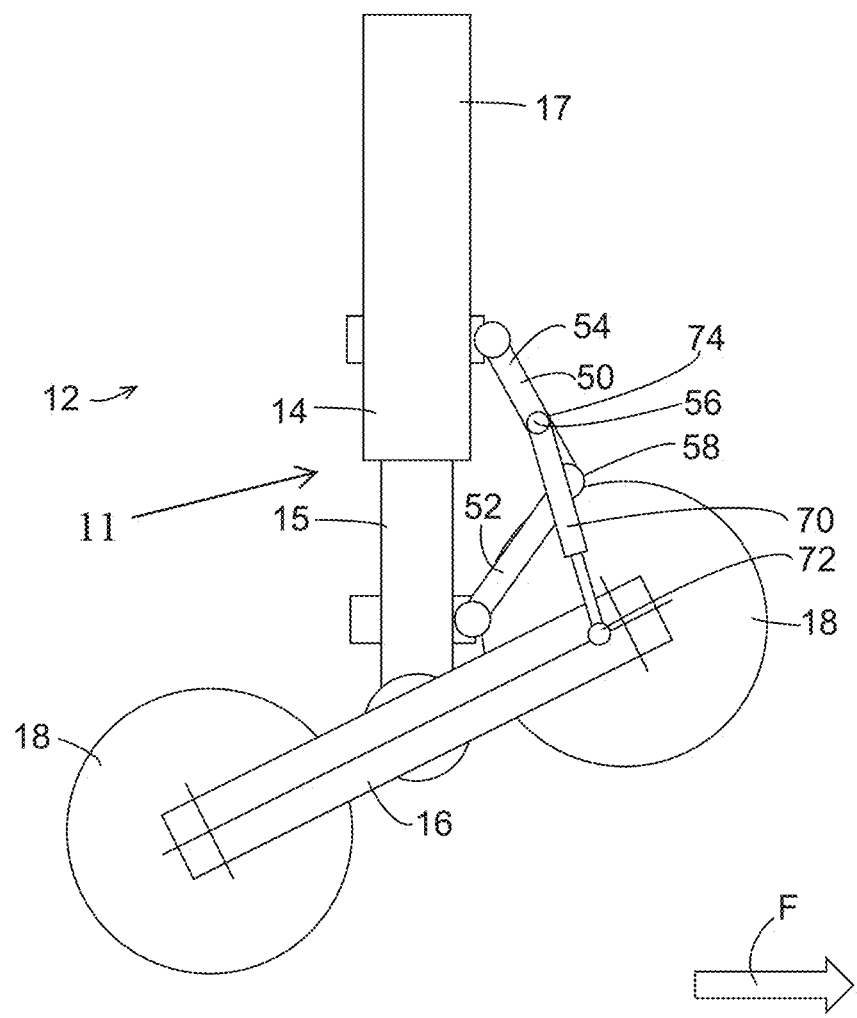
FIG. 6 is a side view of a landing gear in accordance with a first embodiment.

FIG. 6 shows a side view of a landing gear assembly 12 in accordance with a first embodiment. The forward direction in FIG. 6 is shown by arrow F. The landing gear assembly has a leg 14 which includes a bogie 16 mounted on the lower end of the leg 14 in such a way that the bogie may adopt different pitch angles. FIG. 6 shows the bogie pitched up at a pitch angle of about 25 degrees to the horizontal. The bogie, in this example, carries two sets of wheels 18. The landing gear leg 14 has a shock absorber 11 including a slider part 15, e.g., a rod, arranged to slide within a cylinder part 17, the slider and cylinder forming an oleo-type shock absorber. The landing gear assembly 12 includes a torque link assembly 50 having a first (lower) torque link 52 attached to the slider part 15 and a second (upper) torque link 54 attached to the cylinder part 17 of the landing gear leg 14. The lower torque link 52 is coupled to the upper torque link 54 via a hinge at the apex 58 of the torque link assembly 50. There may also be a false torque link set (not shown in FIG. 6) to the rear of the landing gear leg 14. The pitch angle of the bogie 16 is able to be varied by means of a pitch trimmer device 70. The pitch trimmer device 70 is mounted at one end 72 to an attachment joint at an end of the bogie 16. The pitch trimmer device 70 is mounted at the other end 74 to an attachment joint 56 located on the upper torque link at a location nearer the apex than to the attachment location of the upper torque link 54 to the cylinder. The attachment joint 56 may be provided in and/or on the torque link specifically for the purpose of attaching one end of the pitch trimmer device. FIG. 6 shows that the pitch trimmer device extends directly between a mounting location on the bogie and a mounting location on the torque link assembly.

Figure 7:
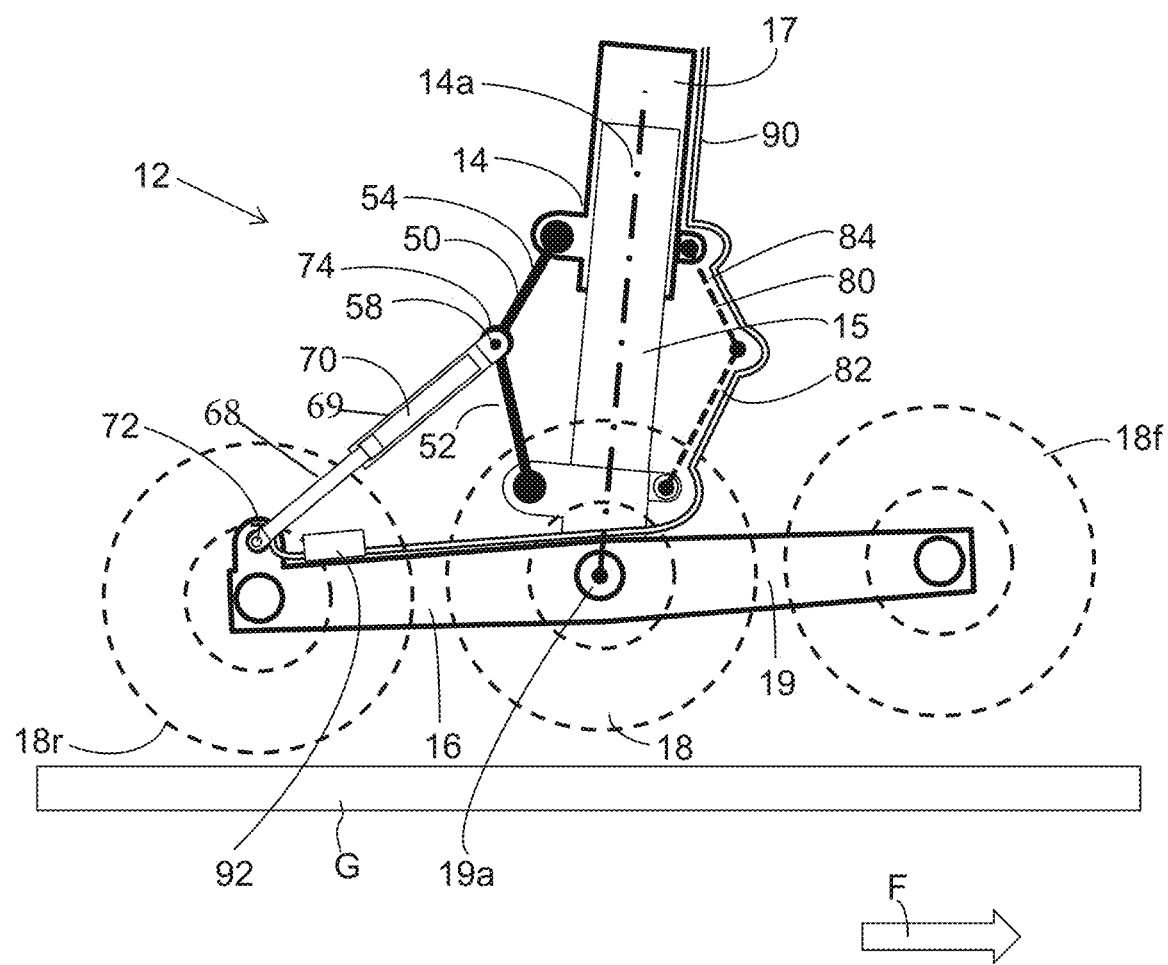
FIG. 7 is a side view of a landing gear and pitch trimmer in accordance with a second embodiment.
Figure 8:
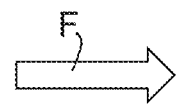
FIG. 8 is a side view of the landing gear of FIG. 7 showing the line of action of the pitch trimmer.

FIGS. 7 and 8 relate to a retractable landing gear and pitch trimmer in accordance with a second embodiment. Like reference numerals denote like elements, and only those elements of the landing gear of FIGS. 7 and 8 which differ significantly with respect to those of FIG. 6 will now be discussed. The beam of the bogie 16 is labelled with reference number 19. The bogie beam 19 supports three sets of wheels 18, one set 18f at the front, one set in the middle, and one set 18r at the rear. The bogie beam 19 pitch changes as it rotates about a pivot point 19a at the lower end of the landing gear leg. The torque link set 50 is provided to the rear of the landing gear leg. The pitch trimmer device 70 is mounted at one end 72, via a ball and socket type joint to an end of the bogie 16. The other end 74 of the pitch trimmer device 70 is mounted to an attachment joint located at the apex 58 of the torque link assembly 50. A false torque link set 80, of lower strength and mass, is provided to the front of the landing gear leg 14. The false torque link set 80 has a first (lower) torque link 82 attached to the slider part 15 of the landing gear and a second (upper) torque link 84 attached to the cylinder part 17. FIGS. 7 and 8 show the longitudinal axis 14a of the landing gear leg 14. The axis 14a is shown angled to the vertical.

It will be seen that the pitch trimmer has been positioned to the rear, which may provide protection against, for example, bird strike by means of the shielding provided during flight by the landing gear leg.

The free-in-air bogie beam angular position ("trail angle") is set to facilitate the retraction of the landing gear into the available space within the wheel well in the airframe of the aircraft. As shown in FIG. 7, the trail angle means that all tyres do not touch the ground at the same time on landing, because the rear (aft) wheel 18r is closer to the flat horizontal ground, labelled G in FIG. 7, than the front wheel 18f. Thus, when the wheels first touchdown, the trail angle of the bogie beam 19 changes. The pitch trimmer 70 controls the trail angle of the bogie beam 19 with the landing gear assembly 12 in flight. It also permits the bogie 16 to adjust its angular position as required as the aircraft contacts the ground G in various attitudes, and also provides a damping function to control bogie pitching vibrations during take-off and landing. In this embodiment, the pitch trimmer is able to actively position the bogie trail at the correct angle for landing gear retraction after take-off (by means of driving the bogie to the correct pitch angle under the power of the linear hydraulic actuator powered by a hydraulic circuit of the aircraft). The hydraulic pipes 90 for supplying hydraulic power to the pitch trimmer 70 (illustrated only in FIG. 7) are routed via the false torque links 80. Local means 92 (again, illustrated only in FIG. 7) may be provided to provide control and/or provide a local fluid reservoir for the hydraulic power fed to the pitch trimmer device 70 by the hydraulic pipes 90.

FIG. 8 shows some of the forces that act on the landing gear and pitch trimmer in accordance with the second embodiment. Various parts of the landing gear assembly are omitted from FIG. 8 for the sake of clarity. The pitch trimmer (represented by arrow 70 in FIG. 8) pushes in a line of action 70a that extends between the attachment joint at the end of the bogie 16 and the apex 58 of the torque link assembly 50. The moment arm (illustrated by arrow 96) is aligned with axis 95, which is perpendicular to axis 70a and intersects pivot point 19a in FIG. 8. The moment arm 96 is about one metre long and therefore compares favourably with the equivalent moment arm of the prior art arrangement of FIG. 2. The geometry of the landing gear assembly is such that when the pitch trimmer is fully extended and the landing gear leg is fully extended (i.e. in flight) the angle (labelled as angle A in FIG. 8) between the longitudinal axis 14a of the landing gear leg and the line of action 70a is about 45 degrees. In such a configuration, the angle (labelled as angle B in FIG. 8) between the bogie beam axis 16a and the line of action 70a is about 40 degrees. When the aircraft is on the ground with the landing gear leg compressed, the angles A and B may change by a few degrees or so.

The pitch trimmer is provided in the form of a lightweight linear hydraulic actuator having a mass very roughly of the order of 25 Kg (less than 40 Kg), a length between attachment points of over 1.0 m when fully open/extended to under 1.0 m when fully closed/compressed. The diameter of the hydraulic cylinder 69 of the pitch trimmer, at its widest is of the order of 10 cm (less than 20 cm). The pitch trimmer, including the rod 68 and cylinder 69, is thus relatively lightweight and slender, which is made possible by the improved moment arm mentioned above, which enables the same effective hinge moment with a lower mass actuator.

Figure 9:
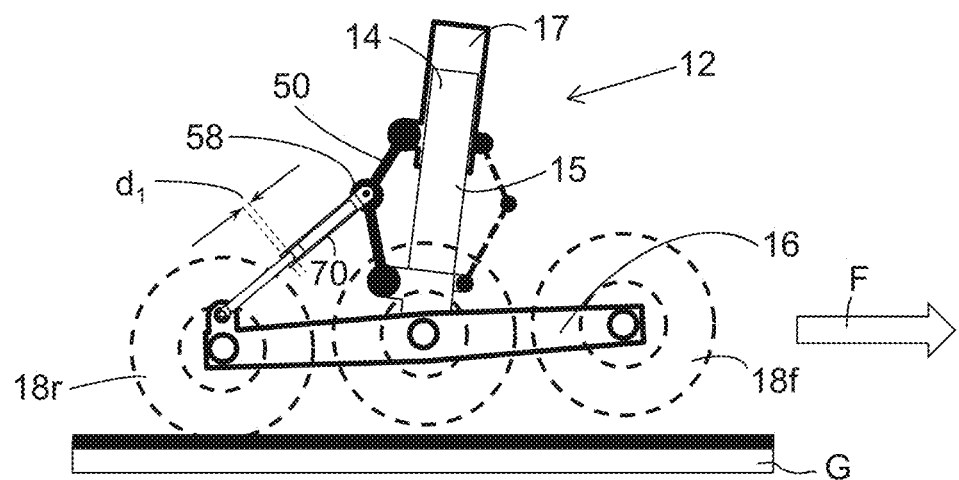
FIGS. 9 and 10 are side views showing the position of the pitch trimmer shown in FIGS. 7 and 8, when landing the aircraft in accordance with a method of a third embodiment, during which the weight on wheels condition is detected.
Figure 10:
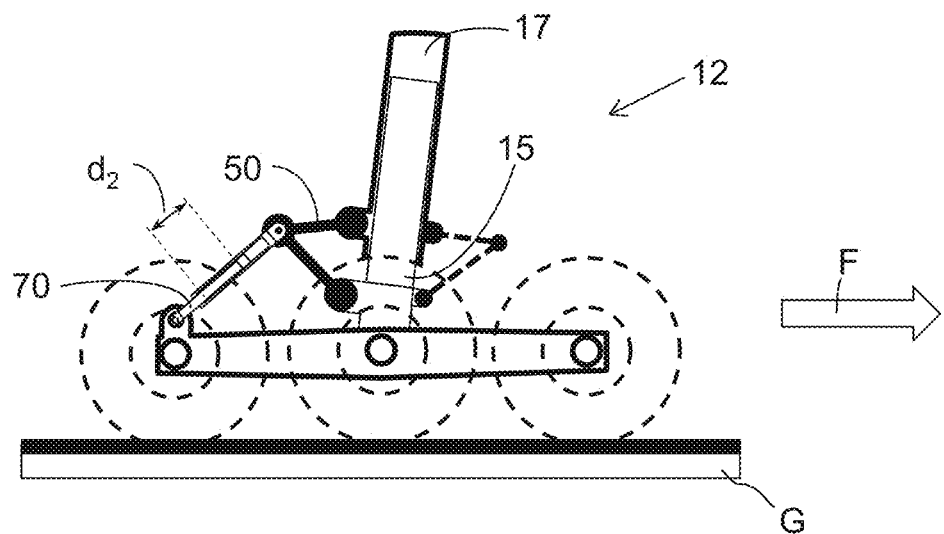

Use of the pitch trimmer, of a type similar to that shown in FIGS. 7 and 8, in a method of landing an aircraft will now be described in connection with a third embodiment of the invention, which is illustrated by FIGS. 9 and 10. The apparatus shown in FIGS. 9 and 10 can be assumed to be substantially identical to that shown in FIGS. 7 and 8 and as such like reference numerals are used to denote like elements. Some elements are not shown for the sake of clarity.

FIG. 9 shows the landing gear assembly 12 immediately after touchdown of the rear wheel 18r of the bogie 16. The front wheel is still off the ground G. The main oleo shock absorber of the landing gear leg 14 is about to start to compress. Any movement of the slider 15 into the cylinder 17 would cause the torque link to close (the included angle getting smaller), thus urging the apex 58 of the torque link assembly away from the landing gear leg 14. The bogie 16 has just started to rotate as a result of touchdown of the rear wheel 18r. The pitch trimmer devices thus compresses by a distance $d_1$. It will be seen that either (a) compression of the oleo shock absorber or (b) rotation of the bogie beam clockwise (as seen in FIG. 9) as the front wheel approaches the ground (or both) would cause the pitch trimmer to compress. It is therefore permissible for the pitch trimmer to be at its fullest extent immediately before landing. Such a geometry means that touchdown of the wheels of the bogie will only cause a compression of the pitch trimmer device. Such a compression is detected by a sensor (not shown) in the pitch trimmer, simply as a change in position (as between the position immediately before touchdown and the position immediately after touchdown)—i.e. a movement. An output from the sensor is then used by an aircraft control system as part of the information used to determine when touchdown has occurred and when deceleration of the aircraft can be initiated (e.g. by braking the wheels and/or engaging reverse thrust). FIG. 10 shows the position adopted by the torque link assembly 50, the pitch trimmer 70 and the oleo shock absorber (parts 15, 17) after the aircraft has landed and is stationary on the ground. The oleo shock absorber is compressed and the torque link closed. In this state, the pitch trimmer is part compressed (roughly mid-way along its stroke length) and has moved by a further distance d2 as compared to the position shown in FIG. 10. It will be seen that compression of the pitch trimmer may first be caused by bogie pitching movement alone and then, later, as the oleo breaks out, the pitch trimmer is moved further in the same direction, so that the oleo movement and the bogie pitch movement are summed together at the pitch trimmer device.

The bogie trail angle change during the initial part of the landing may thus be used as an early means of detecting that the aircraft has achieved weight-on wheels (WonW) without needing to wait for sufficient "weight" to be on the gears such that the shock absorbers begin to compress (which may also be independently detected, but only later on). Early and reliable confirmation of WonW may be important as, in certain aircraft, it can be the trigger for deployment of the means of stopping the aircraft (reverse thrust, lift dumpers, maximum wheel braking). Waiting for detection of shock absorber compression, in particular for a lightweight "kiss" landing, perhaps on an icy runway such that the tyres do not spin up, will delay the initiation of the various retardation devices and thus negatively impact the stopping performance of the aeroplane.

Arranging the pitch trimmer such that its end stop position is the position required for retraction (and also for landing) enables the device to be designed so as to be driven in one direction only, which may simplify its design and operation. Also, arranging the pitch trimmer such that it is compressed on landing (and not extended) by bogie pitch, by oleo stroke or by a combination of both bogie pitch and oleo stroke allows for a simple and reliable weight on wheels detection system to be implemented using the pitch trimmer stroke change as a measure of touch-down.

To summarise, firstly, the kinematics of the torque links, the bogie and the pitch trimmer are such that the pitch trimmer is arranged to be approximately centralised (i.e. at or near mid-stroke) as the aircraft achieves the full weight on wheels condition. This then allows adequate stroke in both directions from the "on ground" position to accommodate all the ground-based bogie pitching cases, such as for example jacking one end of the bogie for tyre change, nose gear collapse and the like. Secondly, the kinematics of the torque links, the bogie and the pitch trimmer are such that the pitch trimmer is at its outstop (fullest extent) for the flight cases and for retraction. No case exists in flight where the bogie can be pitched nose down (as the pitch trimmer is already at its fullest extent). Thus the trimmer only needs to function in one direction (i.e. closing from the fully extended condition) for all landing cases. Furthermore, in order to ensure that the bogie is pitched at the correct angle for retraction, the pitch trimmer is required simply to extend to its outstop. Consequentially, the pitch trimmer may be a simple, single acting (one direction) device in lieu of a complex mid-position, dual action device. Lastly, the present embodiment enables the use of onset of pitch trimmer closure/movement as a reliable means of early WonW detection.

Figure 11:
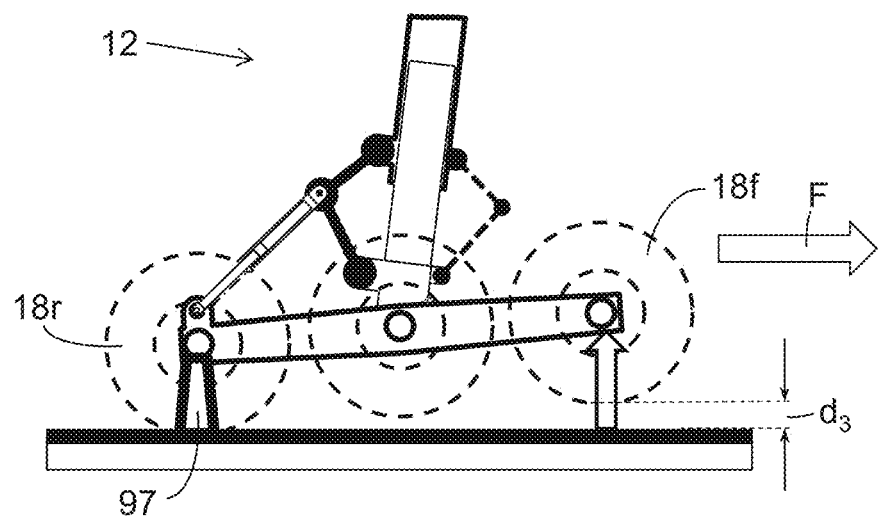
FIG. 11 is a side view showing the position of the pitch trimmer of the landing gear during a method of changing a wheel on the ground in accordance with a fourth embodiment.

Use of the pitch trimmer, of a type similar to that shown in FIGS. 7 and 8, in a method of changing a wheel will now be described in connection with a fourth embodiment of the invention, which is illustrated by FIG. 11. The apparatus shown in FIG. 11 can be assumed to be substantially identical to that shown in FIGS. 7 and 8 and as such like reference numerals are used to denote like elements. Some elements are not shown for the sake of clarity. The method of this fourth embodiment may be used, for example, if a tyre needs changing on a given wheel of the bogie.

The landing gear assembly 12 is shown in FIG. 11 in a position with the aircraft stationary and on the ground. The rear wheel is held in position on the ground by suitable means 97. There is also provided a method of repositioning a landing gear bogie on a landing gear assembly of an aircraft when the landing gear assembly is deployed and the aircraft is on the ground. The method may for example include varying the pitch angle of the landing gear bogie with the length of the pitch trimmer being varied accordingly. Such movement may be effected by means of jacking up the bogie front wheel, with the change in pitch angle of the bogie being taken up by the pitch trimmer operating in a passive mode. As a result of the geometry of the landing gear assembly 12 and the pitch trimmer 70, there may be sufficient stroke length of the pitch trimmer 70 to accommodate at least 200 mm ground clearance (distance $d_3$ shown in FIG. 11) of the front wheel.

Figure 12:
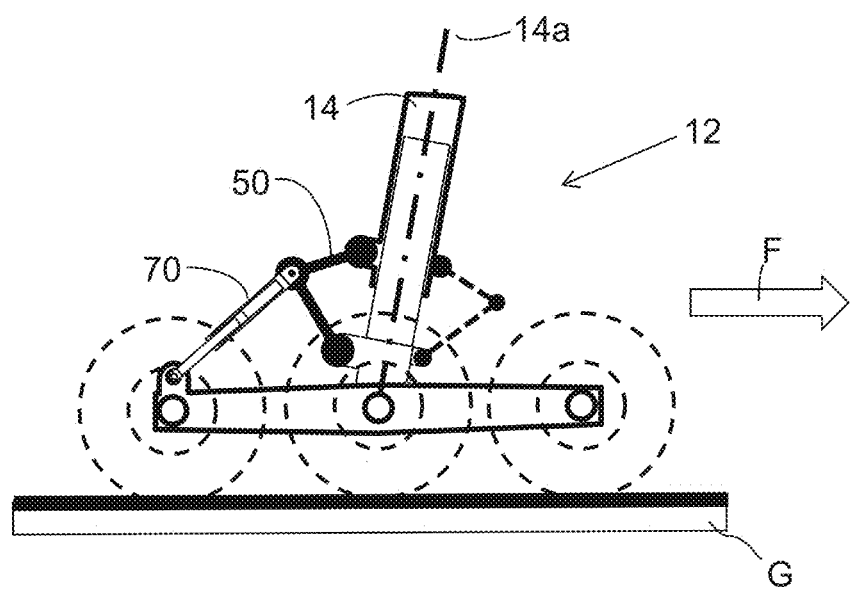
FIG. 12 is a side view showing the position of the pitch trimmer of the landing gear, in accordance with a fifth embodiment, during collapse of the nose of an aircraft on the ground.

A fifth embodiment, in which a nose gear collapse is accommodated is shown in FIG. 12 (similar to FIG. 11). In the nose gear collapse case, the nose of the aircraft is lower than it would normally be such that the axis 14a of the landing gear leg 14 is inclined to be closer to the horizontal (than in the case shown in FIG. 10 for example), thus causing a change in bogie pitch and extension of the pitch trimmer 70. Such an extension of the pitch trimmer 70 can readily be accommodated by the pitch trimmer 70, as a result of the geometry of the landing gear assembly 12 including the connection of the pitch trimmer 70 to the torque assembly 50.

Figure 13:
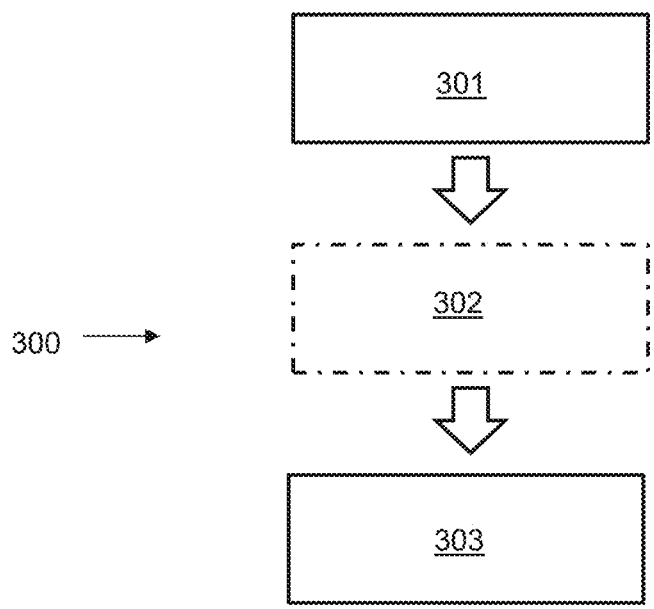
FIG. 13 is a flowchart showing the steps of method of retracting a landing gear assembly from a deployed position to a stowed position of an aircraft on the ground in accordance with a sixth embodiment.
Figure 2:
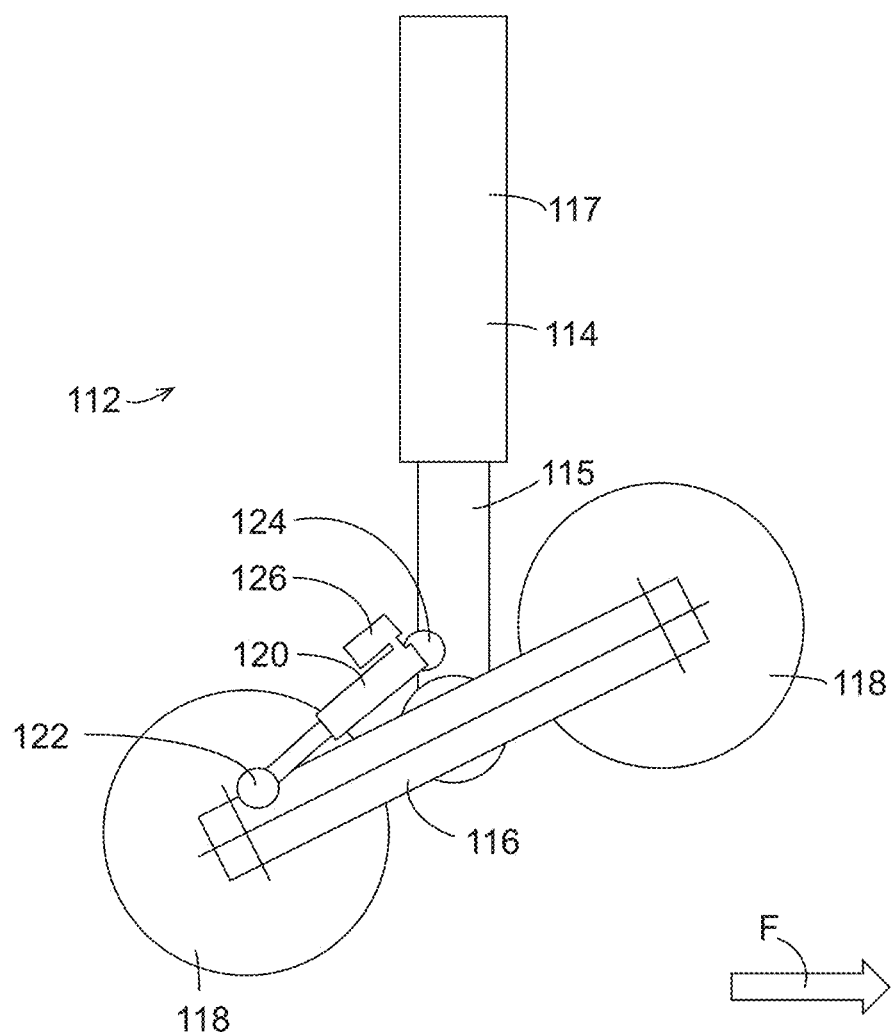
FIG. 2 is a side view of a first example landing gear of the prior art.
Figure 3:
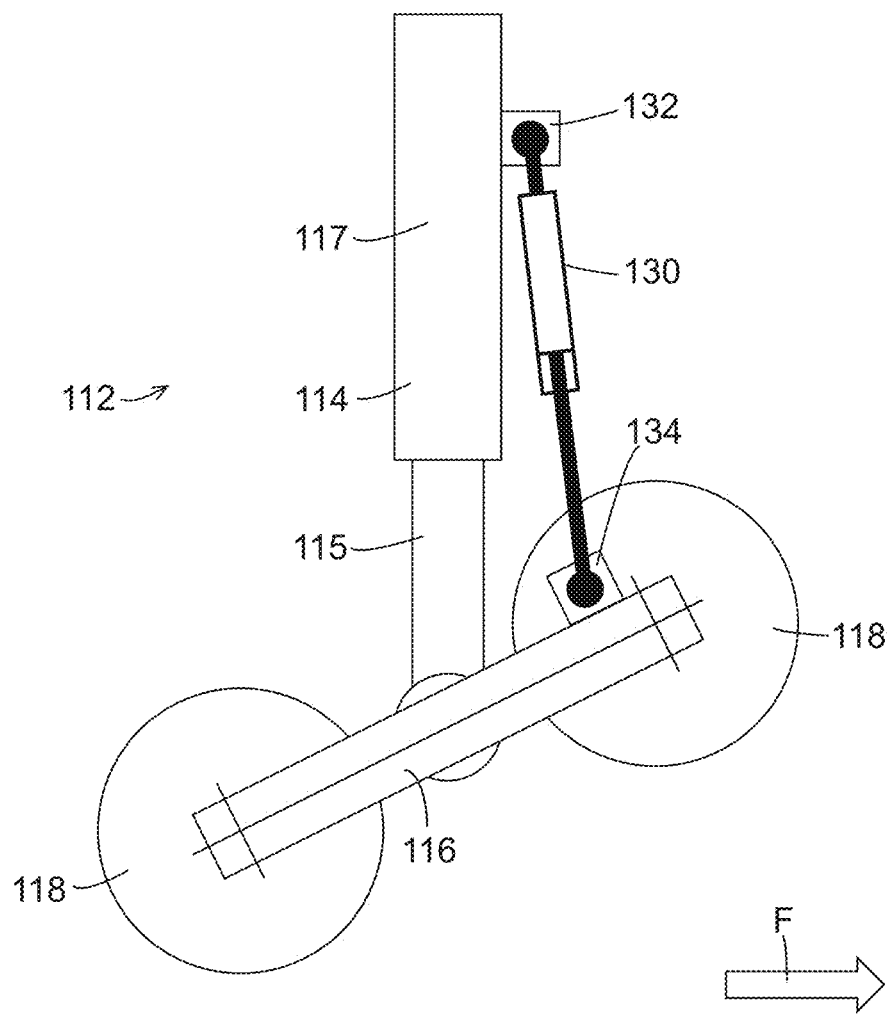
FIG. 3 is a side view of a second example landing gear of the prior art.
Figure 4:
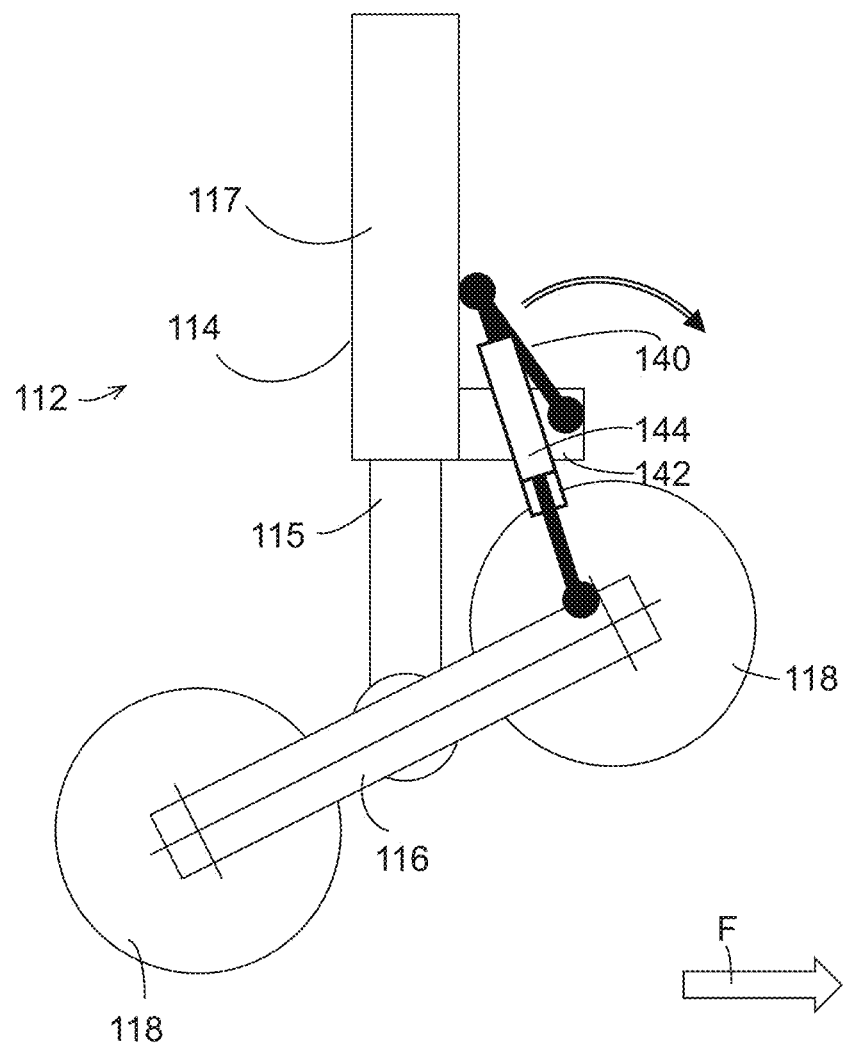
FIG. 4 is a side view of a third example landing gear of the prior art.
Figure 5:
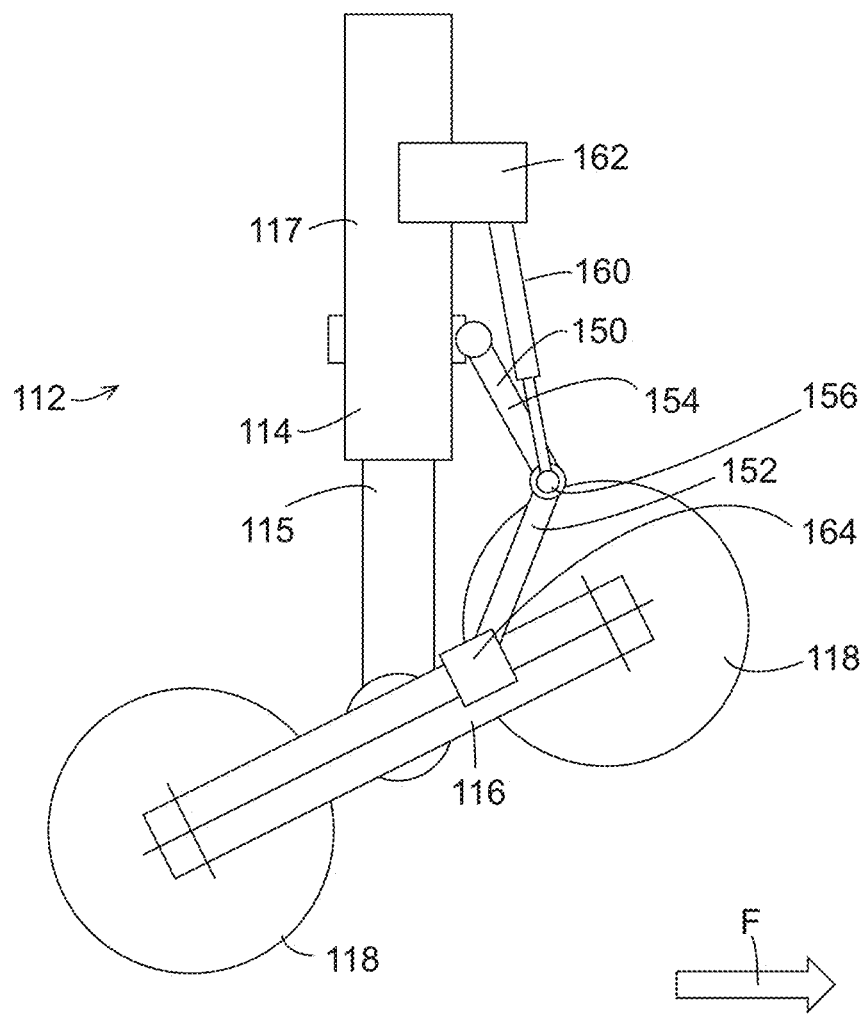
FIG. 5 is a side view of a fourth example landing gear of the prior art.

A flowchart 300 showing the steps performed in a method of retracting a landing gear assembly in accordance with a sixth embodiment is illustrated by FIG. 13. The landing gear assembly employed in the method may be as shown in any of the illustrated embodiments. Thus, the landing gear assembly includes for example a landing gear leg incorporating an oleo shock absorber, a pitchable bogie with multiple sets of wheels, and a link assembly for accommodating movement of the oleo shock absorber while resisting relative rotation of the bogie about the landing gear leg axis. The landing gear is initially (step 301) in its deployed position following take-off. In step 302, the bogie is moved, if necessary, so that it adopts the optimum pitch angle for retraction. This is performed by means of extending the pitch trimmer to its fullest extent. The pitch trimer thus pushes along a line of action that extends between the attachment point on the bogie (at one end of the pitch trimmer) and the attachment point on the link assembly (at the opposite end of the pitch trimmer). The landing gear is then retracted as step 303.

Whilst the present invention has been described and illustrated with reference to particular embodiments, it will be appreciated by those of ordinary skill in the art that the invention lends itself to many different variations not specifically illustrated herein. Some examples of such variations will now be described by way of example only.

The torque link assembly of the landing gear might alternatively connect to different parts of the landing gear yet still provide the function of accommodating translational relative movement of the bogie along the axis of the landing gear leg whilst resisting relative rotational movement of the bogie about that axis.

It may be possible for the pitch trimmer device to be operated without any power being provided. For example, the geometry of the landing gear assembly may be designed such that, when deployed, the pitch trimmer extends to its outstop under the influence of sufficient hydraulic pressure present in the device. Additionally or alternatively, the geometry of the landing gear assembly may be designed such that the natural weight of the bogie and landing gear parts cause the pitch trimmer to be extended to its outstop, under the influence of gravity, when the landing gear is deployed and the aircraft is in flight.

The landing gear shown in the accompanying Figures have two-wheel axles and three-wheel axles. It will be appreciated that landing gear in accordance with the present invention may include a different number of wheels, for example a larger number of wheels, for example eight wheels mounted on a bogie.

The false links and principal torque links may be located the other way around.

It may be preferable in certain aircraft, for example in view of particular requirements of the landing gear retraction kinematics, for the bogie to be pitched nose-down on landing (such that the foremost wheel touches down in advance of the aft wheel).

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A landing gear assembly including:
   a primary load bearing strut comprising a shock absorber including a slider part arranged to slide within a cylinder part,
   a link assembly including a first link member having a first end attached to the cylinder part and a second link member having a first end attached to the slider part, and second ends of the first and second link members are pivotably attached at a hinge;
   a bogie configured to support aircraft landing wheels, wherein the bogie is mounted on the primary load bearing strut such that the bogie may adopt different pitch angles, and
   a pitch trimmer device arranged to set a pitch angle of the bogie,
   wherein the pitch trimmer device is attached at a first end to the bogie and at a second end to the link assembly at, or directly adjacent to, the hinge of the link assembly.

2. The landing gear assembly according to claim 1, wherein the link assembly is a primary torque link assembly of the landing gear assembly.

3. The landing gear assembly according to claim 1, wherein the landing gear assembly comprises a further link assembly which attaches at a first end to the slider part and at a second end to the cylinder part, the further link assembly being the primary torque link assembly of the landing gear assembly.

4. The landing gear assembly according to claim 1, wherein the second end of the pitch trimmer device is attached to the second link member of the link assembly.

5. The landing gear assembly according to claim 1, wherein the geometry of the landing gear assembly is such that the pitch trimmer device is able, in use, to adopt a position in which a line of action of the pitch trimmer device is at an angle of more than 30 degrees to a longitudinal axis of the bogie.

6. The landing gear assembly according to claim 1, wherein a geometry of the landing gear assembly enables the pitch trimmer device to adopt a position in which a line of action of the pitch trimmer device is at an angle of more than 30 degrees to a longitudinal axis of the primary load bearing strut.

7. The landing gear assembly according to claim 1, wherein the landing gear assembly is a retractable landing gear assembly.

8. The landing gear assembly according to claim 7, further comprising a hydraulic pipe connected to the pitch trimmer and configured to supply hydraulic power to the pitch trimmer to control an angular position of the bogie with respect to the primary load bearing strut.

9. The landing gear assembly according to claim 8, wherein while the landing gear assembly is in a full weight-on-the aircraft landing wheels configuration, the pitch trimmer device is extended to in or near a midway position between of a stroke length of the pitch trimmer device.

10. The landing gear assembly according to claim 1, wherein the pitch trimmer device has a length when fully extended that is at least five times a widest diameter of its cylinder.

11. The landing gear assembly according to claim 1, further comprising a flexible joint providing two degrees of freedom of movement between at least one of (a) the first end of the pitch trimmer device and the bogie and (b) the second end of the pitch trimmer device and the link assembly.

12. A wing assembly comprising the landing gear assembly of claim 1.

13. An aircraft including the landing gear assembly of claim 1.

14. An aircraft landing gear assembly including:
a load bearing strut including a shock absorber comprising a slider rod and a cylinder within which slides the slider rod;
a link assembly including a first link member having a first end attached to the cylinder of the load bearing strut and a second link member having a first end attached to the slider rod of the load bearing strut, and second ends of the first and second link members are pivotably attached at a hinge;
a bogie supporting aircraft landing wheels, wherein a center region of the bogie is pivotably mounted to the slider rod, and
a pitch trimmer configured to set a pitch angle for the bogie, the pitch trimmer including a first end directly attached to a position on the bogie spaced from the center region of the bogie, and a second end directly attached to the hinge or to one of the first and second link members proximate to the hinge.

15. The aircraft landing gear assembly of claim 14, wherein the aircraft landing wheels includes at least one wheel proximate a rear end region of the bogie and at least one wheel proximate a front end region of the bogie, and the position on the bogie to which the second end of the pitch trimmer is directly attached is the rear end region or the front end region.

16. The aircraft landing gear assembly of claim 14, wherein the pitch trimmer includes a cylinder and a rod slidably within the cylinder along an axis of the pitch trimmer, wherein the second end of the pitch trimmer is an end of the cylinder of the pitch trimmer, and the first end of the pitch trimmer is an end of the rod of the pitch trimmer.

17. The aircraft landing gear assembly of claim 14, wherein the position on the link assembly to which the second end of the pitch trimmer is directly attached is an apex of the link assembly.

\* \* \* \* \*